United States Patent
Janczukowicz et al.

(10) Patent No.: US 10,469,363 B2
(45) Date of Patent: Nov. 5, 2019

(54) METHOD FOR DATA EXCHANGE BETWEEN WEB BROWSERS, AND ROUTING DEVICE, TERMINAL, COMPUTER PROGRAM AND STORAGE MEDIUM THEREFOR

(71) Applicant: Orange, Paris (FR)

(72) Inventors: Ewa Janczukowicz, Lannion (FR); Gael Fromentoux, Pleumeur Bodou (FR); Xavier Marjou, Lannion (FR)

(73) Assignee: ORANGE, Paris (FR)

( * ) Notice: Subject to any disclaimer, the term of this patent is extended or adjusted under 35 U.S.C. 154(b) by 139 days.

(21) Appl. No.: 15/536,287

(22) PCT Filed: Dec. 9, 2015

(86) PCT No.: PCT/FR2015/053394
§ 371 (c)(1),
(2) Date: Jun. 15, 2017

(87) PCT Pub. No.: WO2016/097534
PCT Pub. Date: Jun. 23, 2016

(65) Prior Publication Data
US 2018/0331942 A1  Nov. 15, 2018

(30) Foreign Application Priority Data
Dec. 16, 2014 (FR) .................... 14 62523

(51) Int. Cl.
*G06F 13/00* (2006.01)
*H04L 12/707* (2013.01)
(Continued)

(52) U.S. Cl.
CPC .............. *H04L 45/22* (2013.01); *H04L 63/10* (2013.01); *H04L 65/608* (2013.01); *H04L 67/02* (2013.01)

(58) Field of Classification Search
CPC ....... H04L 45/22; H04L 63/10; H04L 65/608; H04L 67/02
(Continued)

(56) References Cited

U.S. PATENT DOCUMENTS 7,899,915 B2 * 3/2011 Reisman ........... G06F 17/30873
709/227
2003/0229900 A1 * 12/2003 Reisman ........... G06F 17/30873
725/87

FOREIGN PATENT DOCUMENTS

WO  2014004040 A1  1/2014
WO  2015057591 A1  4/2015

OTHER PUBLICATIONS

International Search Report dated Mar. 2, 2016 for corresponding International Application No. PCT/FR2015/053394, filed Dec. 9, 2015.
(Continued)

*Primary Examiner* — Kenneth R Coulter
(74) *Attorney, Agent, or Firm* — David D. Brush; Westman, Champlin & Koehler, P.A.

(57) ABSTRACT

A method for exchanging data between a first web browser and a second web browser of a communications network. The method includes a phase of initialization, implementing the following acts in a routing device of the network placed on a default communications path between the first and second browsers: receiving a message for verifying connectivity between the browsers, the message carrying a specific attribute authorizing data exchanges between the browsers; and verifying an authorization of data exchanges between the browsers, from the specific attribute; and in the event of positive verification, modifying at least one routing table for routing data between the first browser and the second browser so as to define a replacement communications path between the browsers, passing through the routing device.

12 Claims, 3 Drawing Sheets (51) Int. Cl.
*H04L 29/06* (2006.01)
*H04L 29/08* (2006.01)

(58) Field of Classification Search
USPC .................................................. 709/227–229
See application file for complete search history.

(56) References Cited

OTHER PUBLICATIONS

J.Rosenberg, "Interactive Connectivity Establishment (ICE): A Protocol for Network Address Translator (NAT) Traversal for Offer/Answer Protocols' IETF RFC 5245", Apr. 1, 2010 (Apr. 1, 2010), XP055154341.
Written Opinion of the International Searching Authority dated Mar. 2, 2016 for corresponding International Application No. PCT/FR2015/053394, filed Dec. 9, 2015.
Mahy, R. et al. "Traversal Using Relays around NAT (TURN): Relay Extensions to Session Traversal Utilities for NAT (STUN)". RFC: 5766, Apr. 2010.
Reddy, T. et al. "TURN Extension for Third Party Authorization draft-reddy-tram-turn-thrid-party-authz-00". Feb. 14, 2014.
Rosenberg J. et al. "Session Traversal Utilities for NAT (STUN)". RFC: 5389, Oct. 2008.
English translation of the Written Opinion dated Jun. 8, 2017 for corresponding International Application No. PCT/FR2015/053394, filed Dec. 9, 2015.

\* cited by examiner

METHOD FOR DATA EXCHANGE BETWEEN WEB BROWSERS, AND ROUTING DEVICE, TERMINAL, COMPUTER PROGRAM AND STORAGE MEDIUM THEREFOR

CROSS-REFERENCE TO RELATED APPLICATIONS

This Application is a Section 371 National Stage Application of International Application No. PCT/FR2015/053394, filed Dec. 9, 2015, which is incorporated by reference in its entirety and published as WO 2016/097534 on Jun. 23, 2016, not in English.

1. FIELD OF THE INVENTION

The field of the invention is that of communications within a communications network and more particularly that of exchanging data between two web browsers.

More specifically, the invention provides a solution for exchanging data between two web browsers that removes the need for the presence of media relays of the TURN (Traversal Using Relays around NAT) server type. It may be recalled that such media relays are classically used to redirect media-type data packets received from a first web browser to a second web browser and vice versa.

The invention finds application especially in data exchanges according to the WebRTC (Web Real-Time Communications) technology enabling peer-to-peer (P2P) communications to be set up directly between two web browsers, installed for example on two user terminals.

2. PRIOR ART

WebRTC technology can be used especially for Visio conferencing communications with P2P media-type data exchanges, file sharing in P2P mode or again Voice over IP (Voice over Internet Protocol) communications.

To this end, a WebRTC communication is classically set up by means of an exchange of signaling messages between two terminals by using the web server of a service provider.

The term "service provider" is understood herein and throughout this document to refer to any entity capable of providing any type of service involving exchanges of data streams, especially in a mobile telecommunications network. The data stream can be carried on the network between a user terminal and a dedicated server of the service provider, or it can be transported between two user terminals.

In particular, in the context of a WebRTC communication, the service provider enables the linking up of two users who then directly exchange data in P2P mode.

The communications produce P2P data streams that mainly use the UDP (User Datagram Protocol) transport protocol or sometimes the TCP (Transmission Control Protocol) transport protocol to exchange data between terminals.

Ideally, according to WebRTC technology, the P2P data streams are exchanged directly between the terminals.

However, the exchange of data in P2P mode is not always possible: it depends on the network configuration. In particular, the exchange of data in P2P mode can be prohibited in the case of access networks that have put P2P traffic out of service or can be made difficult in the case of certain architectures that implement Network Address Translation (or NAT) devices or again firewalls such as for example company networks.

To establish communications in such cases, the WebRTC technology proposes the use of an interactive connectivity establishment (ICE) protocol that increases the chances of passing through NATs or firewalls by discovering and using replacement IP means through three complementary mechanisms:

- the use of the TCP transport protocol instead of the UDP transport protocol;
- the use by the terminals of STUN (Session Traversal Utilities for NAT) servers as described especially in the document "Session Traversal Utilities for NAT (STUN)"—RFC 5389) in order to discover their public addresses when they are placed behind a NAT; and
- the use of TURN (Traversal Using Relays around NAT) servers as described especially in the document "Traversal Using Relays around NAT (TURN): Relay Extensions to Session Traversal Utilities for NAT (STUN)"—RFC 5766), these TURN servers being situated on the public side of a NAT (i.e. generally on the public internet).

The ICE protocol enables terminals to discover possible addresses, also called candidate addresses, that can be used to receive data, for example media-type data. Once discovered by a terminal, these candidate addresses are sent to the remote terminal via the signaling channel. Each terminal then executes a connectivity verification procedure on all the pairs of candidate addresses.

For this verification of connectivity, STUN messages are used, each message comprising a header followed, as the case may be, by one or more attributes. It can be noted that the IP addresses and the port numbers used to exchange STUN messages for verifying connectivity are the same as those used for media-type data exchanges.

If it should happen that there is a plurality of pairs of candidate addresses enabling the terminals to get connected to each other, then one of these pairs is chosen according a pre-determined priority criteria.

In order to secure the exchange of data in P2P mode and to check the access to a TURN server used by a WebRTC services provider, it has been proposed especially to use the "OAuth" protocol as presented in the IETF's TRAM project entitled "Extension TURN for Third-Party Authorization".

Figure 1:
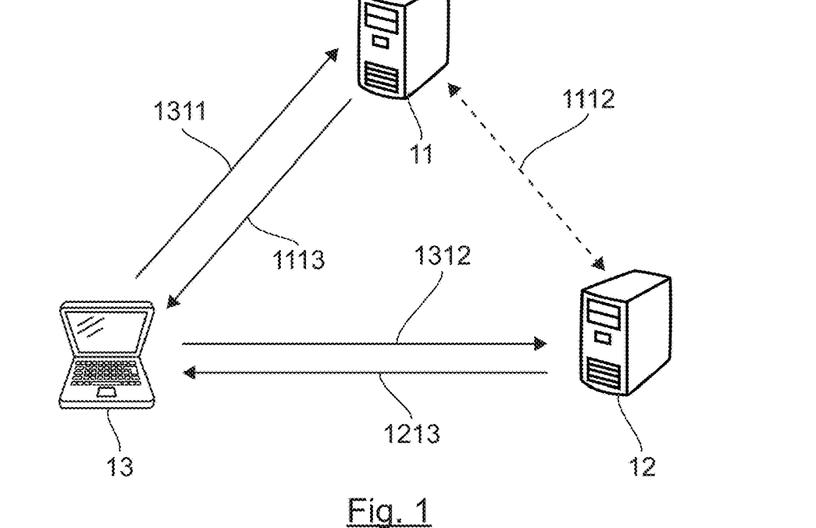
FIG. 1, presented with reference to the prior art, recalls the general principle of the mechanism of authentication "OAuth"

To this end, as illustrated in FIG. 1, an exchange of keys (1112) between an authorization server 11, which may be the WebRTC server, and a TURN server 12, is implemented, enabling a symmetrical key to be placed in the TURN server 12.

To set up a WebRTC communication, a customer 13 sends the authorization server 11 a request for an access token (1311). The authorization server 11 responds by sending the customer 13 an access token and a session key (1113). The customer 13 thus obtains an independent ephemeral token.

The customer 13 then sends a TURN request and the access token (1312) to the TURN server 12. The TURN server 12 validates the access token with its symmetrical key, thus enabling the customer 13 to have access to the services of the TURN server (1213). This implementation enables the production of independent tokens that the TURN server 12 can verify without the assistance of the authorization server 11.

It can be noted that the symmetrical key placed in the TURN server 12 should not be excessively lengthy because the encrypted token must be integrated into a single STUN message.

Through this "OAuth" protocol, it can be verified that the customer who approaches a TURN server (the IP address of which is public) has truly subscribed to a WebRTC services provider that is entitled to the use of this TURN server.

This approach enables the identification and processing of streams in a differentiated way. The TURN server serves as a media relay because its fixed IP address is known. The network service providers or NSPs, for example the internet service providers or ISPs, can use these pieces of information to process these streams (i.e. the streams which have the IP address of the TURN server as their source address or as their destination address) as desired, for example for routing management or for prioritizing QoS (Quality of Service).

It can be noted that, in WebRTC type communications, the routers classically use static IP tables to manage the paths of the streams. The use of media relays, such as TURN servers, is a means of influencing the routing of the WebRTC streams and of re-directing them. Therefore, when a WebRTC services provider wishes to make the media streams pass through a path other than the P2P path, it usually makes use of a TURN server. However, such a server is costly since not only does it process the media-type data streams of a communication but it also executes processing operations such as the routing, control or marking of data.

3. SUMMARY OF THE INVENTION

The invention proposes a novel solution for exchanging data between two web browsers, making it possible especially to remove the need to use a TURN server.

More specifically, the invention proposes a method for exchanging data between a first web browser and a second web browser of a communications network, comprising a phase of initialization implementing the following steps in a routing device of the network placed on a default communications path between the first and second browsers:
- a step for receiving a message for verifying connectivity between the browsers, said message carrying a specific attribute authorizing data exchanges between the browsers;
- a step for verifying an authorization of data exchanges between the browsers, from the specific attribute;
- in the event of positive verification, a step for modifying at least one routing table for routing data between the first browser and the second browser so as to define a replacement communications path between the browsers, passing through the routing device.

The invention thus relies on the use of a routing device, to which particular functions have been assigned, placed on a communications path between the first and second browsers In particular, such a routing device is used to manage the routing decisions between the first web browser and the second web browser so as to enforce the communications between the two browsers via a particular path, called a replacement communications path, which itself also passes through the routing device, for example to avoid problems of congestion on the default path, to enforce passage via a pre-determined intermediate device (such as an accounting device, collecting device), etc.

Such a routing device can especially be managed by a network services provider (NSP).

In particular, the use of such a routing device does away with the need for using a TURN server to exchange data between two web browsers, especially in the context of a WebRTC communication.

It can be noted that, according to the invention, in every case only one message is needed to verify the connectivity between the two terminals. This message generally uses the IP addresses of the P2P mode.

According to one particular embodiment of the invention, the message for verifying connectivity between the browsers is of a STUN type.

In other words, the routing device receives a particular STUN message coming from the first web browser. This STUN message carries a specific attribute authorizing data exchanges between the browsers.

For example, such a specific attribute is an access token which can be generated by an authorization server (which can be a WebRTC server).

The routing device can then check whether the exchange of data between the browsers is authorized, for example by implementing a "STUN verification" type function.

Such a function can especially be downloaded and stored in the routing device or it can be implemented by calling up an applications programming interface (or API) providing such a function.

According to a first example, the step for verifying an authorization of data exchanges implements a key known to the routing device to verify the validity of the access token. Such a key is for example provided by a network services provider, and is symmetrical with a key used to obtain the access token.

According to a second example, the step for verifying an authorization of data exchanges implements an exchange of information with an authorization server to verify the validity of the access token.

In the event of positive verification, the routing device can modify at least one routing table for routing data between the first browser and the second browser, for example a table storing the source and destination IP addresses of the data. Therefore, according to the invention, dynamic routing tables are considered.

According to one particular embodiment of the invention, the method for exchanging data also comprises a phase for exchanging data implementing the following steps in the routing device:
- a step for receiving a data stream (of the media type) coming from the first browser;
- a step for transmitting the data stream (of the media type) to the second browser, via a pre-determined network intermediate device placed on the replacement communications path.

According to this embodiment, the routing device therefore enforces the exchange of data between two browsers via a pre-determined intermediate device, enabling for example a counting of traffic or a collection of traffic information.

In another embodiment, the invention relates to a routing device of a communications network that is to be placed on a default communications path between a first web browser and a second web browser of said network, the routing device comprising:
- a module for receiving a message for verifying connectivity between the browsers, said message carrying a specific attribute authorizing data exchanges between the browsers;
- a module for verifying an authorization of data exchanges between the browsers, from said specific attribute;
- a module for modifying at least one routing table for routing data between the first browser and the second browser, activated in the event of positive verification, so as to define a replacement communications path between the browsers, passing through the routing device.

Such a routing device is especially suited to implementing the method for exchanging data described here above.

This routing device could of course comprise the different characteristics related to the method for exchanging data according to the invention, which can be combined or taken in isolation. Thus, the characteristics and advantages of this routing device are the same as those of the method for exchanging data. They are therefore not described in greater detail.

The invention also relates to a method for transmitting data from a first web browser to a second web browser of a communications network, comprising a step during which said first browser sends out a signaling message requesting a communication (for example of the WebRTC type) with said second browser. Said method furthermore comprises the following steps:

reception, by the first browser, of a specific attribute authorizing data exchanges between the browsers, given by an authorization server;

generation of a message for verifying connectivity between the browsers, said message carrying said specific attribute; and transmission of the message to the second browser via a routing device of the network placed on a default communications path between the first and the second browsers.

Such a method therefore enables the generation of a message for verifying connectivity between the browsers, the message carrying a specific attribute. Such a message is transmitted from the first web browser to the second web browser, via the routing device. It can therefore be at least partially read and processed by the routing device.

For example, such a message is of the STUN type and carries a specific attribute corresponding to an access token. Such an access token can be generated by an authorization server.

Such a method is especially implemented by a terminal using a first web browser so that this first web browser can communicate in P2P mode with a second web browser, according to the WebRTC technology, without requiring the use of a TURN server.

In another embodiment, the invention relates to a terminal of a communications network, equipped with a first web browser designed to transmit data to a second web browser contained in a remote terminal of said network, and comprising a module for sending out a signaling message requesting a communication (for example of a WebRTC type) with said second web browser. Said terminal furthermore comprises:

a module for receiving a specific attribute authorizing data exchanges between the browsers, given by an authorization server;

a module for generating a message for verifying connectivity between the browsers, said message carrying said specific attribute;

a module for transmitting the message to the second browser via a routing device of the network placed on a default communications path between the first and the second browsers.

Such a terminal is especially suited to implementing the method for transmitting data described here above.

This terminal could of course include the different characteristics of the method for transmitting data according to the invention, which can be combined or taken in isolation.

Thus, the characteristics and advantages of this terminal are the same as those of the method for transmitting data. They are therefore not described in greater detail.

In particular, such a terminal can be of the telephone, tablet, computer or other type equipped with an internet browser. According to one particular embodiment, such an internet browser is compatible with the WebRTC technology.

In another embodiment, the invention relates to one or more computer programs comprising instructions to implement the method for exchanging data or the method for transmitting data as described here above, when this program or these programs are executed by a processor.

In yet another embodiment, the invention relates to one or more non-detachable, or partially or totally detachable storage medium readable by a computer, and comprising instructions of one or more computer programs for the execution of the steps of the method for exchanging data or of the method for transmitting data as described here above.

4. LIST OF FIGURES

Other features and advantages of the invention shall appear more clearly from the following description of one particular embodiment, given by way of a simple illustratory and non-exhaustive example and from the appended drawings, of which.

5. DESCRIPTION OF ONE EMBODIMENT OF THE INVENTION 5.1 General Principle

The general principle of the invention relies on the use of a particular routing device between two web browsers, enabling communications to be directed on a particular communications path for data exchanges between the two browsers.

More specifically, the invention enables authorized traffic, i.e. it enables a data stream, provided with a specific attribute authorizing data exchanges between the browsers, to be conveyed by a specific network path in modifying routing tables. Thus, this traffic is re-directed so that it passes for example through a device used to count traffic or collect traffic information. This specific attribute is given by the WebRTC services provider, and the associated processing can be performed by a network services provider (NSP).

Figure 2A:
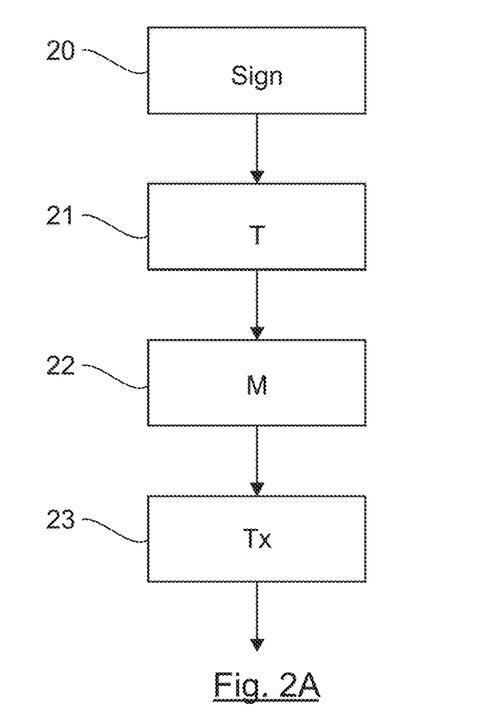
FIGS. 2A and 2B respectively present the main steps implemented by a method for transmitting data and a method for exchanging data according to one embodiment of the invention.

Referring to FIG. 2A, we present the main steps implemented by a first customer, equipped with a first web browser, to transmit data to a second customer equipped with a second web browser within a communications network. It can be noted that the same operations can be implemented for the transmission of data from the second customer to the first customer since the communications are symmetrical.

During a first step 20, the first browser sends a signaling message requesting communications with the second browser.

During a second step 21, the first customer receives a specific attribute authorizing data exchanges between the browsers, for example an access token T given by an authorization server (for example a WebRTC server).

Then during a third step 22, the first customer generates a message for verifying connectivity between the browsers. Such a message M carries the specific attribute T.

This message for verifying connectivity is then transmitted to the second browser during a fourth step 23 via a routing device of the network placed on a default communications path between the first and second browsers.

The message for verifying connectivity can thus be analyzed and processed by the routing device of the network.

Figure 2B:
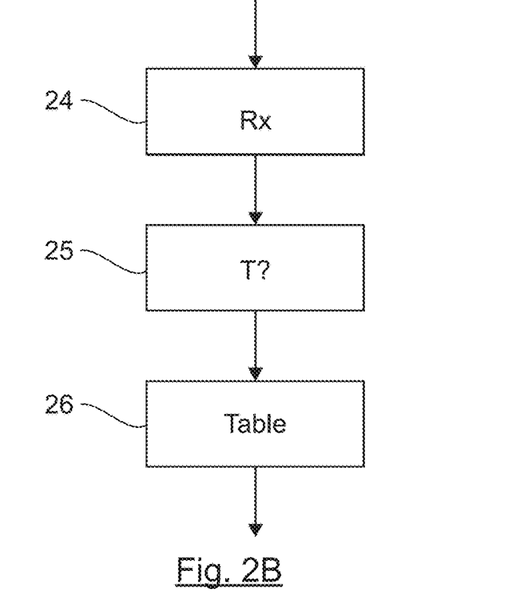

Referring now to FIG. 2B, we present the main steps implemented by the routing device of the network, placed on a default communications path between the first and second browsers, to exchange data between the two browsers.

In an initialization phase, a routing device of this kind implements a first step 24 for receiving a message for verifying connectivity between the browsers. Such a message carries a specific attribute authorizing data exchanges between the browsers. In particular, such a message is the message M generated by the first customer, carrying the specific attribute T.

During a second step 25, the routing device carries out a verification of an authorization of data exchanges between the first and second browsers. During this second step, the routing device validates the fact that the first web browser and the second web browser can exchange data directly, in P2P mode.

In the event of positive verification, the routing device, in a third step 26, modifies at least one routing table for the routing of data between the first and the second web browsers.

This modification of the routing table or tables makes it possible especially to define a replacement communications path between the two web browsers which itself also passes through the routing device. This replacement path serves, for example, to avoid problems of congestion on the best communications path between the web browsers and the internet server for the exchange of media-type data (also called a default path or main path), enforce the passage of data via a pre-determined intermediate device of the network, etc.

According to one particular embodiment, during a data exchange phase, the routing device carries out additional steps for receiving a data stream, for example a media-type data stream, from the first browser, and for transmitting the data stream to the second browser via a pre-determined intermediate device of the network placed on the replacement communications path.

According to this particular embodiment, the data streams exchanged between two web browsers are thus re-directed to force these streams to pass through a pre-determined intermediate device of the network, for example a counting device or an information-collecting device.

The term "data stream" is understood here to mean a set of data packets transmitted in one direction between two entities of the network. Classically, a data stream is characterized by a source IP address (that of the sender of the stream), a source port number, a destination IP address (that of the intended recipient), a destination port number and a transport protocol.

The invention can be applied especially to data exchanges between web browsers according to the WebRTC technology, in using a STUN server.

It may be recalled in this respect that the STUN server is not present on data communications paths in WebRTC technology. It is used by the web browsers/terminals at certain points in time during the communications, especially to discover the network.

Given this context, the invention therefore proposes the use of a routing device of the network capable of reading STUN messages to carry out specialized routing management.

To this end, the invention relies on the use, in this context, of access tokens and an "OAuth" type authentication mechanism to identify the media-type data streams that have the authorization to be re-directed, in compliance with agreements between WebRTC communications service providers, and network service providers for example. In addition, the invention in one particular embodiment proposes that the re-directed traffic should pass through a pre-determined intermediate device, serving for example to count the traffic or to collect traffic information.

In this context, the invention therefore enriches the IETF's TRAM project entitled "Extension TURN for Third-Party Authorization" referred to here above in proposing a solution for re-directing the media-type data stream even when there is no media relay whatsoever in the communications path.

This solution is advantageously light as compared with the providing of these functions by a GGSN (it may be recalled that a Gateway GPRS Support Node or GGSN is an interconnection gateway between a mobile packet network and external IP networks).

5.2 Detailed Example of Implementation

Here below, we present a detailed example of implementation of the invention, for the exchange of media-type data between two customers according to the WebRTC technology.

Figure 3:
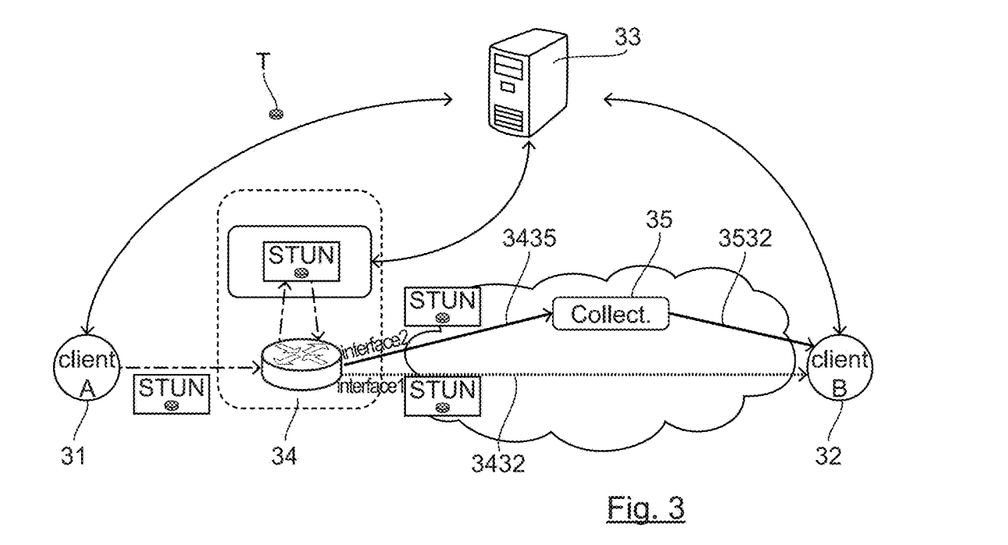
FIG. 3 illustrates an example of a network using the invention.

To this end, we consider a communications network illustrated in FIG. 3, comprising two customer terminals 31 and 32, each equipped with a web browser supporting WebRTC technology, an authorization server 33, a routing device 34 and a pre-determined intermediate device 35.

The routing device 34 is placed on the main WebRTC communications path and is managed by a network services provider.

Figure 4:
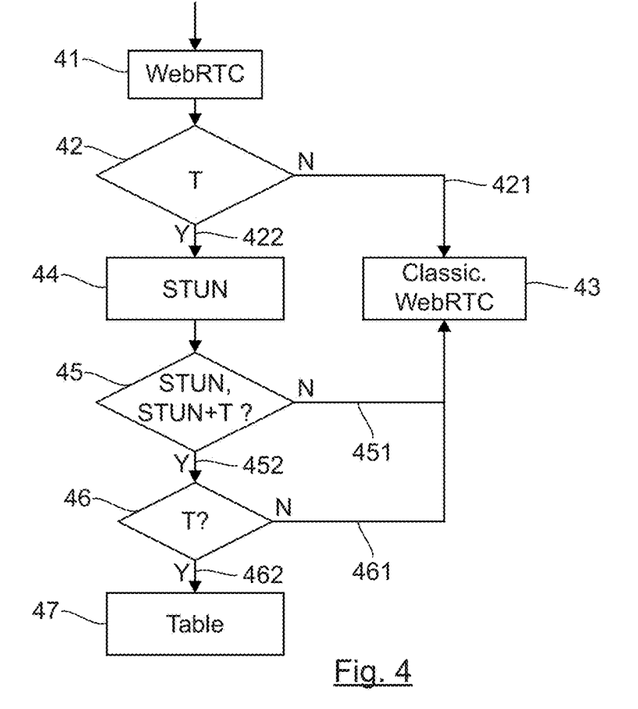
FIGS. 4 and 5 are flowcharts presenting the operations implemented by the different devices of the network of FIG. 3 according to one embodiment of the invention.
Figure 5:
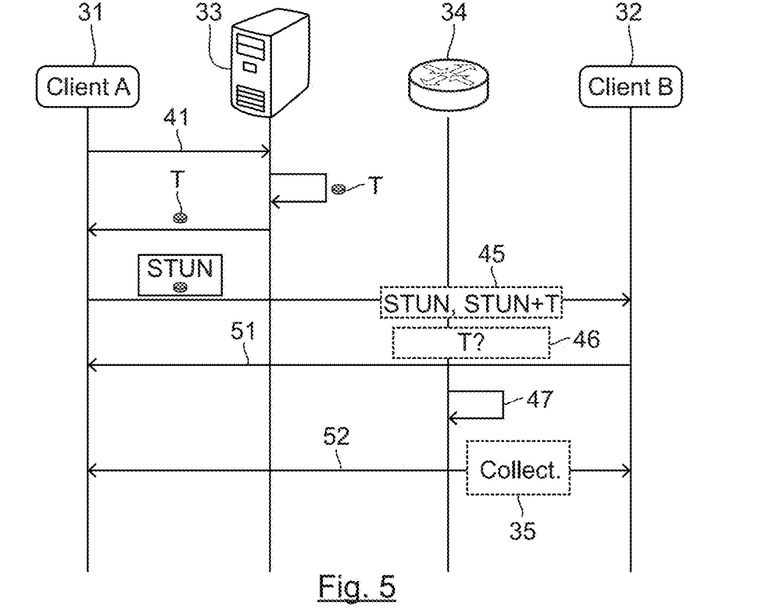

Here below, referring to FIGS. 4 and 5, a description is provided of the operations carried out to transmit data from the web browser of the first customer A 31 to the web browser of the second customer B 32. Again, it can be noted that the same operations can be implemented for the transmission of data from the web browser of the second customer B 32 to the web browser of the first customer A 31.

As illustrated in FIG. 3, the customers A 31 and B 32 are considered to be the end points of the network that set up WebRTC communications.

According to this example, the first customer A 31 wishes to initiate (41) a session of data exchanges in P2P mode with the second customer B 32, according to the WebRTC technology.

To this end, the customer A 31 must first of all obtain (42) an access token T from the authorization server 33. Such an authorization server 33 can be provided by a WebRTC services provider. This server can be the same as the one used to set up the WebRTC connection.

More specifically, when the first customer A 31 calls the second customer B 32, there is a beginning of a setting up of a WebRTC communication. The signaling can be provided by the web server of the WebRTC services provider. The WebRTC services provider decides whether a given communication must preferably be re-directed (changing of the routing tables and possible passage through a pre-determined intermediate device). If the answer is yes, the WebRTC services provider gives an access token to the first customer A 31 and/or the second customer B 32 since the communication is symmetrical.

If the first customer A 31 does not obtain any access token T from the authorization server (421), a "classic" WebRTC session is initiated, without any change in the routing tables and without modifying the main communications path between the first customer A 31 and the second customer B 32 (43).

If the customer A 31 obtains an access token T from the authorization server (422), he generates (44) a message for verifying connectivity between the web browser of the first customer A 31 and the web browser of the second customer B 32. Such a message carries a specific attribute, namely the access token T, for authorizing data exchanges between the browsers. For example, such a message is of the STUN type.

According to this embodiment, a STUN message used to set up a connection in WebRTC communications therefore includes an additional STUN attribute, namely the "access token" T.

The STUN message carrying the access token is transmitted by the first customer A 31 to the second customer B 32 via the routing device 34 which implements the classic operations for verifying connectivity for all the ICE candidates. The second customer B 32 sends a STUN response (51) to the first customer A 31.

The routing device 34 is capable of analyzing the STUN messages (which are not encrypted) to detect whether a STUN message carries an access token type attribute (45).

Following the analysis of the STUN message, if the routing device does not identify any access token type additional attribute in the STUN message (451), a "classic" WebRTC session is initiated without any change in the routing tables and without modification of the main communications path between the first customer A 31 and the second customer B 32 (43).

If the routing device identifies an access token type additional attribute in the STUN message (452), it verifies (46) the validity of the access token. The verification of the token is therefore implemented by a given network device, the routing device 34.

The routing device 34 therefore carries out the operations for verifying connectivity and the validity of the token. To this end, the routing device implements a function for verifying STUN messages, acquired for example by downloading a "STUN verification" function as part of its microprogram or by calling up a programming interface that provides a "STUN verification" function. The function of verifying STUN messages thus verifies the token. In particular, it can be noted that the routing device 34 can read the STUN messages used during verifications of ICE connectivity, because it is assumed that these messages are not encrypted.

This verification of the validity of the token can be done for example according to the following variants:

for an independent access token, the network service providers can set up a symmetrical key; the routing device can then use this symmetrical key to verify the access token, without any need to call the authorization server 33 each time it wishes to verify the access token;

for a classic access token, the routing device must call the authorization server 33 whenever it wishes to check the access token.

Such a verification implements for example a mechanism of authentication of the "OAuth" type (or its different versions) as described with reference to FIG. 1, without the use of TURN servers.

In the event of a negative verification (461), the invention initiates a "classic" WebRTC session without change in the routing tables and without modification of the main communications path between the first customer A 31 and the second customer B 32 (43).

In the event of a positive verification (462), the routing device dynamically modifies (47) the table or tables for routing data between the first customer A 31 and the second customer B 32, so as to define a replacement communications path between the two customers.

The WebRTC communication can thus be re-directed to this new replacement communications path between the two customers. The first customer A 31 and the second customer B 32 can then communicate in P2P mode in exchanging media-type data (52).

For example, as illustrated in FIG. 3, the main communications path between the first customer A 31 and the second customer B 32, according to a "classic" WebRTC communication, is the one illustrated by the dotted line referenced 3432. The replacement communications path between the first customer A 31 and the second customer B 32 in this embodiment of the invention is the one passing through the pre-determined intermediate device 35 referenced 3435 and 3532.

According to this example, following the verifications of connectivity, the routing device can re-direct the data stream having valid tokens so that they pass through an additional device, the pre-determined intermediate device 35. Such an intermediate device 35 can be used to count traffic, collect traffic information etc. This information can be used by the service providers to obtain statistics, control access, invoice communications service users, etc.

Thus, by analyzing STUN messages and verifying the validity of at least one access token, the routing device 34 can manage the routing decisions by modifying the routing tables (table of IP addresses for example).

It can be noted that the proposed solution requires that the routing device 34 be placed between two end points or WebRTC customers. This solution is therefore particularly valuable for internet access providers.

The following tables present a simplified version of the routing tables managed by the routing device 34 of FIG. 3 before and after the implementation of the invention according to one particular embodiment.

| Before Modification: | | | After Modification: | | |
|---|---|---|---|---|---|
| Destination | Network Mask | Interface | Destination | Network Mask | Interface |
| Default | — | Interface 1 | Address Customer B | 255.255.255.255 | Interface 2 |
| | | | Default | — | Interface 1 |

In the context of a "classic" WebRTC communication, the routing table defines a main communications path for data exchanges between the first customer A 31 and the second customer B 32, also called a default path. The output interface of the routing device 34 is the Interface 1.

In the context of a WebRTC communication according to one embodiment of the invention, the routing device adds a new input corresponding to the IP address of the second client B 32 on a second interface of the routing device in the routing table. The routing table thus defines another communications path for the exchange of data between the first customer A 31 and the second customer B 32, also called a replacement communications path, different from the default communications path. The output interface of the routing device 34 is then the interface 2. The network mask used (255.255.255.255) means that the use of this replacement path is reserved for a precise destination (the address of the second customer B 32).

It can be noted that this routing management is possible because the IP addresses and the port numbers used to exchange STUN messages for the discovery of the network/ the verifications of connectivity are the same as those used for the transmission of media-type data streams. In other words, a media-type data stream uses the same IP addresses and the same port numbers as does the associated STUN message.

In addition, if the STUN message is a "classic" message, comprising no additional attribute of the access token type, or if the validity of the access token is not verified, the media-type data stream is sent on the default path.

The proposed solution is therefore transparent to users.

5.3 Simplified Structures

Figure 6:
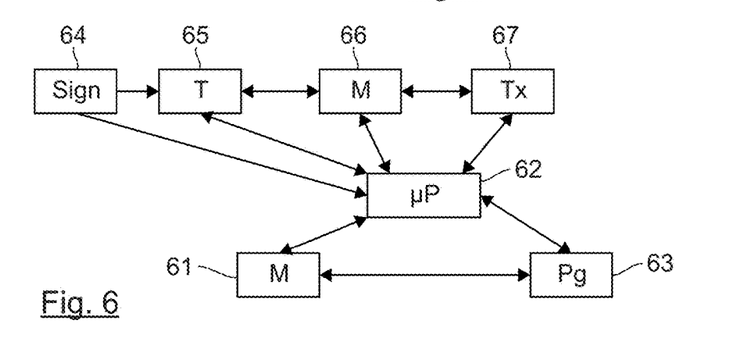
FIGS. 6 and 7 respectively present the simplified structure of a terminal and a routing device according to one particular embodiment of the invention.
Figure 7:
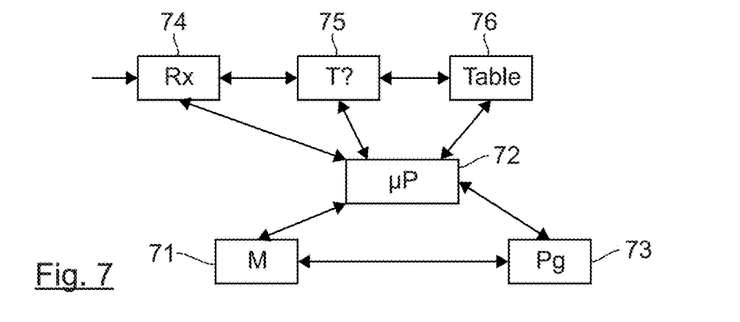

Finally, referring FIGS. 6 and 7, we present the simplified structure of a terminal and a simplified structure of a routing device respectively implementing a method for transmitting data and a method for exchanging data according to one of the embodiments described here above.

As illustrated in FIG. 6, a terminal according to one embodiment of the invention comprises a memory 61 comprising a buffer memory, a processing unit 62 equipped for example with a microprocessor µP and driven by the computer program 63, implementing the method for transmitting data from a first web browser to a second web browser described here above.

At initialization, the code instructions of the computer program 63 are for example loaded into a RAM and then executed by the processor of the processing unit 62. The microprocessor of the processing unit 62 implements the steps of the data transmission method described here above, according to the instructions of the computer program 63, to send out a signaling message requesting communications with said second browser, receive a specific attribute for the authorization of data exchanges between the browsers, generate a message for verifying connectivity between browsers and transmit this message to a routing device of the network. To this end, the terminal comprises, in addition to the buffer memory 61, a module 64 for sending a signaling message requesting communications with the second browser, a module 65 for receiving a specific attribute authorizing data exchanges between the browsers, a module 66 for generating a message for verifying connectivity between the browsers, a module 67 for transmitting a message to the second browser, via a routing device of the network.

These modules are driven by the microprocessor of the processing unit 62.

As illustrated in FIG. 7, a routing device according to one embodiment of the invention comprises a memory 71 comprising a buffer memory, a processing unit 72 equipped for example with a microprocessor µP and driven by the computer program 73, implementing the method for exchanging data between a first web browser and a second web browser described here above.

At initialization, the code instructions of the computer program 73 are for example loaded into a memory RAM and then executed by the processor of the processing unit 72. The processing unit 72 inputs a message for verifying connectivity between the browsers. The microprocessor of the processing unit 72 implements the steps of the method for exchanging data described here above, according to the instructions of the computer program 73, to extract a specific attribute authorizing data exchanges between the browsers from the message for verifying connectivity, verify an authorization for exchanging data between the browsers and modify at least one routing table for routing data between the browsers. To this end, the routing device comprises, in addition to the buffer memory 71, a reception module 74 for receiving a message verifying connectivity between the browsers, a verification module 75 for authorizing data exchanges between the browsers, and a modification module 76 for modifying at least one routing table for routing data between these browsers.

These modules are driven by the microprocessor of the processing unit 72.

The invention claimed is:

1. A method for exchanging data between a first web browser and a second web browser of a communications network, wherein the method comprises:
    a phase of initialization, implementing the following acts in a routing device of said network placed on a default communications path between said first and second browsers:
    receiving a message for verifying connectivity between said browsers, said message carrying a specific attribute authorizing data exchanges between said browsers;
    verifying an authorization of data exchanges between said browsers, from said specific attribute; and
    in the event of positive verification, modifying at least one routing table for routing data between said first browser and said second browser so as to define a replacement communications path between said browsers, passing through said routing device.

2. The method for exchanging data according to claim 1, further comprising a phase for exchanging data implementing the following acts in said routing device:

receiving a data stream coming from said first browser; and transmitting said data stream to said second browser, via a pre-determined network intermediate device placed on said replacement communications path.

3. The method for exchanging data according to claim 1, wherein said message for verifying connectivity between the browsers is of a STUN type.

4. The method for exchanging data according to claim 3, wherein said act of verifying an authorization of data exchanges between said browsers implements a "STUN verification" type function.

5. The method for exchanging data according to claim 1, wherein the specific attribute is an access token.

6. The method for exchanging data according to claim 5, wherein the act of verifying an authorization of data exchanges implements a key known to said routing device to verify the validity of said access token.

7. The method for exchanging data according to claim 5, wherein the act of verifying an authorization of data exchanges implements an exchange of information with an authorization server to verify the validity of said access token.

8. A method comprising the following acts by a terminal equipped with a first web browser:

transmitting data from the first web browser to a second web browser of a communications network, comprising the following acts:

said first web browser sending out a signaling message from the terminal over the communications network requesting a communication with said second browser;

receiving, by said first browser, a specific attribute authorizing data exchanges between said browsers, sent by an authorization server over the communications network;

generating a message for verifying connectivity between said browsers, said message carrying said specific attribute; and transmitting said message to said second browser via a routing device of said communications network over a default communications path between said first and second browsers, enabling the routing device to at least partially read and process the message to define a replacement communications path between said browsers, which is different from the default communications path and also passes through the routing device.

9. A routing device of a communications network that is to be placed on a default communications path between a first web browser and a second web browser of said network, wherein said routing device comprises:

a non-transitory computer-readable medium comprising instructions stored thereon;

a processor configured by the instructions to perform acts comprising:

for receiving a message for verifying connectivity between said browsers, said message carrying a specific attribute authorizing data exchanges between said browsers;

verifying an authorization of data exchanges between said browsers, from said specific attribute; and modifying at least one routing table for routing data between said first browser and said second browser, activated in the event of positive verification, so as to define a replacement communications path between said browsers.

10. A terminal of a communications network, equipped with a first web browser designed to transmit data to a second web browser contained in a remote terminal of said network, the terminal comprising:

a non-transitory computer-readable medium comprising instructions stored thereon;

a processor configured by the instructions to perform acts comprising:

sending out a signaling message from the terminal over the communications network requesting a communication with said second web browser;

receiving a specific attribute authorizing data exchanges between said browsers, sent by an authorization server over the communications network;

generating a message for verifying connectivity between said browsers, said message carrying said specific attribute; and transmitting said message to said second browser via a routing device of said communications network over a default communications path between said first and second browsers, enabling the routing device to at least partially read and process the message to define a replacement communications path between said browsers, which is different from the default communications path and also passes through the routing device.

11. A non-transitory computer-readable medium comprising a computer program stored thereon comprising instructions to implement a method for exchanging data between a first web browser and a second web browser of a communications network, when this program is executed by a processor in a routing device, wherein the instructions configure the routing device to perform acts comprising:

a phase of initialization, implementing the following acts in a routing device of said network placed on a default communications path between said first and second browsers:

receiving a message for verifying connectivity between said browsers, said message carrying a specific attribute authorizing data exchanges between said browsers;

verifying an authorization of data exchanges between said browsers, from said specific attribute; and in the event of positive verification, modifying at least one routing table for routing data between said first browser and said second browser so as to define a replacement communications path between said browsers, passing through said routing device.

12. A non-transitory computer-readable medium comprising a computer program stored thereon comprising instructions to implement a method of transmitting data from a first web browser to a second web browser of a communications network, when this program is executed by a processor of a terminal in the network, wherein the instructions configure the terminal to perform acts comprising:

said first browser of said terminal sending out a signaling message over the communications network requesting a communication with said second browser;

receiving, by said first browser, a specific attribute authorizing data exchanges between said browsers, sent by an authorization server over the communications network;

generating a message for verifying connectivity between said browsers, said message carrying said specific attribute; and transmitting said message from the terminal to said second browser via a routing device of said communications network over a default communications path between said first and second browsers, enabling the routing device to at least partially read and process the message to define a replacement communications path between said browsers, which is different from the default communications path and also passes through the routing device.

* * * * *